US011265512B2

United States Patent
Abbas

(10) Patent No.: US 11,265,512 B2
(45) Date of Patent: *Mar. 1, 2022

(54) DOOR-KNOCKING FOR TELECONFERENCING

(71) Applicant: Vitalchat, Inc., San Francisco, CA (US)

(72) Inventor: Ghafran Abbas, Ashburn, VA (US)

(73) Assignee: Vitalchat, Inc., Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/109,391

(22) Filed: Dec. 2, 2020

(65) Prior Publication Data

US 2022/0006975 A1    Jan. 6, 2022

Related U.S. Application Data

(63) Continuation of application No. 16/918,162, filed on Jul. 1, 2020, now Pat. No. 10,887,552.

(51) Int. Cl.
*H04N 7/15* (2006.01)
*H04M 3/56* (2006.01)

(52) U.S. Cl.
CPC ............ *H04N 7/155* (2013.01); *H04M 3/567* (2013.01); *H04M 3/568* (2013.01); *H04M 2201/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,751,531 | B2* | 6/2014 | Ishikawa | G06F 40/284 |
| | | | | 707/776 |
| 9,244,906 | B2* | 1/2016 | Houache | G06F 40/274 |
| 2009/0243833 | A1* | 10/2009 | Huang | G16H 10/65 |
| | | | | 340/505 |
| 2015/0213414 | A1* | 7/2015 | Zuckerman | G06Q 10/1095 |
| | | | | 705/7.19 |
| 2017/0287316 | A1* | 10/2017 | Wildman | G08B 25/10 |
| 2019/0281161 | A1* | 9/2019 | Yamakawa | G06F 8/65 |
| 2020/0258619 | A1* | 8/2020 | Ogawa | H04Q 3/62 |

\* cited by examiner

*Primary Examiner* — Phung-Hoang J Nguyen
(74) *Attorney, Agent, or Firm* — Young Basile Hanlon & MacFarlane, P.C.

(57) ABSTRACT

A method for teleconferencing between a monitoring device and a user device includes establishing an audio channel connection between the user device and the monitoring device of a remote user; displaying an entry code on a display of the monitoring device; obtaining from a user of the monitoring device a verbal confirmation of the entry code; and, in response to receiving the entry code from the remote user, enabling a camera of the monitoring device. In response to the verbal confirmation, the entry code is sent to the remote user. Enabling the camera of the monitoring device establishes an audio-visual connection between the user device and the monitoring device.

17 Claims, 8 Drawing Sheets

DOOR-KNOCKING FOR TELECONFERENCING

CROSS-REFERENCE TO RELATED APPLICATION(S)

This application is a continuation of U.S. application patent Ser. No. 16/918,162, filed Jul. 1, 2020, the entire disclosure of which is hereby incorporated by reference.

TECHNICAL FIELD

This disclosure relates generally to teleconferencing and more specifically to door-knocking for teleconferencing whereby the video channel of the teleconference is enabled only after a certain handshake between a monitoring device (or a local user) and a remote device (or a remote user).

BACKGROUND

The use for telehealth, telemonitoring, and/or televisits has been increasing and the need for such capabilities has increased especially in response to the COVID-19 pandemic. "Tele" in this context means "from a distance" or "remotely," and more specifically using telecommunication capabilities. Patient rooms may be equipped (in a fixed way or in a movable way) with a telecommunication device (i.e., a monitoring device) that enables telehealth, telemonitoring, and/or televisits. The monitoring device may enable audio and/or visual communication between a remote user (e.g., a physician, a family member, etc.) and an in-room person (e.g., the patient, a nurse, etc.).

SUMMARY

Disclosed herein are implementations of door-knocking for teleconferencing.

A first aspect is a method for teleconferencing between a monitoring device and a user device. The method includes establishing an audio channel connection between the user device and the monitoring device of a remote user; displaying an entry code on a display of the monitoring device; obtaining from a user of the monitoring device a verbal confirmation of the entry code; and, in response to receiving the entry code from the remote user, enabling a camera of the monitoring device. In response to the verbal confirmation, the entry code is sent to the remote user. Enabling the camera of the monitoring device establishes an audio-visual connection between the user device and the monitoring device.

A second aspect is a system for teleconferencing including a monitoring device and a server. The server is configured to receive, from a first user device of a first remote user, a first request to establish a first audio-visual connection between the monitoring device and the first user device; transmit, to the monitoring device, an entry code for display on a display of the monitoring device; and, in response to receiving the entry code from the first remote user, direct the monitoring device to enable a camera of the monitoring device. The monitoring device is configured to establish an audio connection with the first user device; receive from a monitored user of the monitoring device a confirmation to send the entry code to the first remote user; and enable the camera of the monitoring device in response to being directed by the server to enable the camera.

A third aspect is a monitoring device of a user including a processor. The processor is configured to receive, from a remote device, a request to enable a microphone of the monitoring device; receive an announcement of a remote user; display on a monitor of the monitoring device an entry code; receive from the user a confirmation of the entry code; transmit, in response to the confirmation, the entry code to the remote user; and enable, in response to receiving the entry code from the remote user, a camera of the monitoring device.

These and other aspects of the present disclosure are disclosed in the following detailed description of the embodiments, the appended claims, and the accompanying figures.

It will be appreciated that aspects can be implemented in any convenient form. For example, aspects may be implemented by appropriate computer programs which may be carried on appropriate carrier media which may be tangible carrier media (e.g., disks) or intangible carrier media (e.g., communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

BRIEF DESCRIPTION OF THE DRAWINGS

The disclosure is best understood from the following detailed description when read in conjunction with the accompanying drawings.

Figure 1:
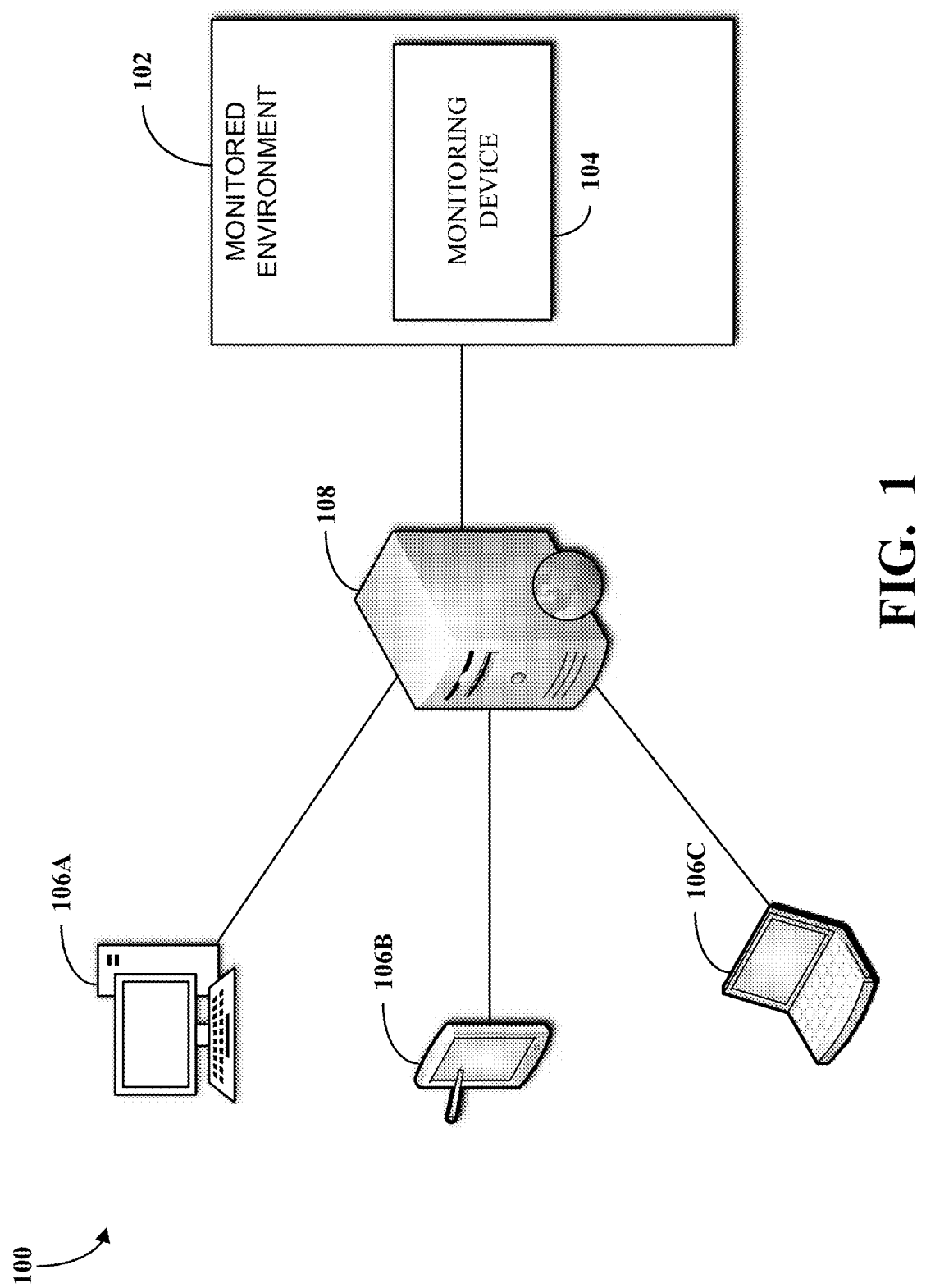
FIG. 1 is an schematic of an example of a system according to implementations of this disclosure.

These and other aspects of the present disclosure are disclosed in the following detailed description of the embodiments, the appended claims, and the accompanying figures.

It will be appreciated that aspects can be implemented in any convenient form. For example, aspects may be implemented by appropriate computer programs which may be carried on appropriate carrier media which may be tangible carrier media (e.g., disks) or intangible carrier media (e.g., communications signals). Aspects may also be implemented using a suitable apparatus, which may take the form of programmable computers running computer programs arranged to implement the methods and/or techniques disclosed herein. Aspects can be combined such that features described in the context of one aspect may be implemented in another aspect.

DETAILED DESCRIPTION

As mentioned above, a monitoring device can enable audio and/or visual communication between a remote user (e.g., a physician, a family member, etc.) and an in-room (e.g., the patient, a nurse, etc.). As used herein, a person initiating a call (i.e., a teleconference request) is referred to as a remote user, and a person receiving the call is referred to herein as a local user.

The local user may not have immediate physical access to the monitoring device and/or may not be capable of physically interacting with the monitoring device. For example, the monitoring device may be at distance away from the local user. For example, the monitoring device may be mounted on the wall of the local user's room. Additionally, the local user (e.g., a patient) may not be in a condition to get out of bed, walk to the monitoring device, and accept the call by, for example, pressing a button.

One solution is to simply have the monitoring device automatically accept the call and enable the audio (e.g., a microphone and a speaker) and video (e.g., a camera) input/output devices of the monitoring device. For example, a physician can initiate a call to a patient's room (i.e., to the monitoring device that is in the patient's room) to conduct a patient visit and the physician can immediately see into the patient's room and hear the sounds of the room. However, such a solution may be too intrusive and does not respect the privacy of the patient. For example, the patient may not be ready, at the moment that the call was received, to accept or engage in the call. For example, the patient may be changing his/her clothes.

Implementations of door-knocking for teleconferencing according to this disclosure balance the local user's privacy with the local user's inability to interact with a monitoring device in responding to requests for teleconferencing from a remote user. In response to receiving a request for a teleconference from a remote user, instead of automatically enabling both the audio and video channels of the monitoring device, only the audio channel can be automatically enabled and the video channel is not enabled until a certain successful handshake between the monitoring device (or the local user) and a remote device of the remote user (or the remote user). The handshake can include requiring the remote user to enter a code (i.e., an entry code) to enable the video channel of the monitoring device. In an example, the entry code can be sent (e.g., electronically or verbally sent) to the remote user. In an example, the entry code can be provided by the local user to the remote user via the audio channel of the teleconference. In an example, the entry code may be displayed to the local user on a display of the monitoring device and the local user in turn reads the entry code to the remote user.

Details of door-knocking for teleconferencing are described herein with initial reference to a system in which the teachings herein can be implemented.

FIG. 1 is an schematic of an example of a system 100 according to implementations of this disclosure. The system 100 includes a monitored environment 102, a monitoring device 104, a user device 106, and a server 108.

The monitored environment 102 can be a patient hospital room, a nursing home room, a room of a home patient, a manufacturing line, a workstation, a laboratory, and the like. The monitored environment 102 includes and/or can be viewed using the monitoring device 104. The monitored environment 102 can be remotely monitored from the user device 106. The user device 106 can be one or more of a desktop computer 106A, a mobile device 106B (such as tablet, a smart phone, and the like), a laptop computer 106C, or some other device that can be used to access, communicate with, and/or control (directly or indirectly) the monitoring device 104. A user (not shown) of the user device 106 can monitor the monitored environment 102 via the monitoring device 104. That the monitored environment 102 is remotely monitored by the user means that the user may not physically be in the monitored environment 102 while performing the monitoring.

In the case that the monitored environment 102 is a patient hospital room, the user can be a physician, a nurse, another health-care practitioner, a family member of the patient, and/or the like. For example, the physician may be remotely responding to (e.g., diagnosing, mitigating, assessing, etc.) a patient emergency or remotely performing patient rounds. The nurse may be monitoring patients, including the monitored environment 102 from a nurses station to, for example, ensure that no patient is falling, is in need of help, is distressed, and/or the like. The family member of the patient may remotely visit with the patient using the monitoring device 104.

The monitoring device 104 can be configured to and/or used to capture video, images, audio, environmental conditions, or other characteristics of the monitored environment. The characteristics of the monitored environment can be transmitted to one or more users of the user devices 106. Via the user device 106, the user can interact with the monitoring device, such as by sending and/or receiving captured video and/or audio, sending commands to the monitoring device 104, and the like.

The user device 106 and the monitoring device 104 can communicate via the server 108. For example, the user device 106 can send commands to the server 108, which relays the command to the monitoring device. Similarly, the monitoring device 104 can send information to the server 108, which relays the information to the user device 106.

To illustrate, the monitoring device 104 can include a camera that is configured to view the monitored environment 102. The user device 106 can issue a request to the server 108 to establish a connection with the monitoring device 104. The server 108 can establish the connection. Issuing a request to the server 108 to establish a connection can include, for example, the user device 106 connecting to a patient by the patient's room number or name; the server 108 determining the monitoring device 104 of the patient (i.e., the monitoring device that is in the patient's room); and the server 108 connecting the user device 106 and the monitoring device 104. The connection session may be an video communication session during which the user can communicate visually and/or verbally with a person in the patient's room. The user device 106, may during the connection session, send a pan, tilt, or zoom (PTZ) command to the camera of the monitoring device 104 via the server 108. The monitoring device 104 can update the view of the monitored environment according to the PTZ command and send back, via the server 108, a video and/or image of the updated view of the monitored environment, which can then be displayed on a display of the user device 106. In an example, the server 108 can allow certain users to control monitoring device and not allowing other user devices to control the monitoring device.

In another example (not shown), the user device 106 can establish a peer-to-peer communication channel with the monitoring device 104. For example, in response to the connection request, the server 108 can facilitate the establishment of the peer-to-peer (e.g., direct) communication between the user device 106 and the monitoring device 104.

The server 108 can be deployed (e.g., physically located) on premise at the location of the monitored environment. The server 108 can be deployed on a same local area network (LAN) of the monitoring device 104. The server 108 can be deployed on a same wide area network (WAN) of the monitoring device 104. The server 108 can be a cloud-based server. Other deployments of the server 108 are possible.

The monitoring device 104, the user device 106, and the server 108 can communicate over any suitable network. The network (not shown) can be, for example, the Internet or an Internet Protocol (IP) network, such as the World Wide Web. The network can be a LAN, a WAN, a virtual private network (VPN), cellular telephone network, a private network, an extranet, an intranet, any other means of transferring information (e.g., video streams, audio streams, images, other information), or a combination thereof from one end point to another end point.

In an example, the user device 106 and the monitoring device 104 may communicate using a real-time transport protocol (RTP) for transmission of the media content, which may be encoded, over the network. In another implementation, a transport protocol other than RTP may be used (e.g., a Hypertext Transfer Protocol-based (HTTP-based) streaming protocol). For example, the user device 106 can transmit and/or receive media content (e.g., audio and/or video content) to and/or from the monitoring device 104 via WebRTC, which provides web browsers and mobile applications with real-time communication. However, the disclosure herein is not so limited and any other real-time transmission protocol can be used.

Figure 2:
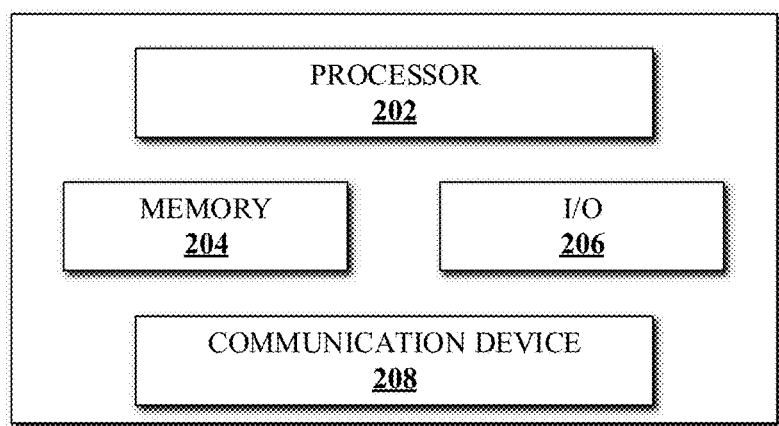
FIG. 2 is a block diagram of an example of a computing device.

FIG. 2 is a block diagram of an example of a computing device 200. Each of the monitoring device 104, the user device 106, or the server 108 can be implemented, at least partially, by the computing device 200.

The computing device 200 can be implemented by any configuration of one or more computers, such as a microcomputer, a mainframe computer, a supercomputer, a general-purpose computer, a special-purpose/dedicated computer, an integrated computer, a database computer, a remote server computer, a personal computer, a laptop computer, a tablet computer, a cell phone, a personal data assistant (PDA), a wearable computing device, or a computing service provided by a computing service provider, for example, a web host or a cloud service provider. In some implementations, the computing device can be implemented in the form of multiple groups of computers that are at different geographic locations and can communicate with one another, such as by way of a network. While certain operations can be shared by multiple computers, in some implementations, different computers are assigned to different operations. In some implementations, the system 100 can be implemented using general-purpose computers/processors with a computer program that, when executed, carries out any of the respective methods, algorithms, and/or instructions described herein. In addition, or alternatively, for example, special-purpose computers/processors including specialized hardware can be utilized for carrying out any of the methods, algorithms, or instructions described herein.

The computing device 200 can have an internal configuration of hardware including a processor 202 and a memory 204. The processor 202 can be any type of device or devices capable of manipulating or processing information. In some implementations, the processor 202 can include a central processor (e.g., a central processing unit or CPU). In some implementations, the processor 202 can include a graphics processor (e.g., a graphics processing unit or GPU). Although the examples herein can be practiced with a single processor as shown, advantages in speed and efficiency can be achieved by using more than one processor. For example, the processor 202 can be distributed across multiple machines or devices (each machine or device having one or more processors) that can be coupled directly or connected via a network (e.g., a local area network). The memory 204 can include any transitory or non-transitory device or devices capable of storing executable codes and data that can be accessed by the processor (e.g., via a bus). The memory 204 herein can be a random-access memory (RAM) device, a read-only memory (ROM) device, an optical/magnetic disc, a hard drive, a solid-state drive, a flash drive, a security digital (SD) card, a memory stick, a compact flash (CF) card, or any combination of any suitable type of storage device. In some implementations, the memory 204 can be distributed across multiple machines or devices, such as in the case of a network-based memory or cloud-based memory. The memory 204 can include data (not shown), an operating system (not shown), and an application (not shown). The data can include any data for processing (e.g., an audio stream, a video stream, a multimedia stream, user commands, and/or other data). The application can include programs that permit the processor 202 to implement instructions to generate control signals for performing functions of the techniques in the following description.

In some implementations, in addition to the processor 202 and the memory 204, the computing device 200 can also include a secondary (e.g., external) storage device (not shown). When present, the secondary storage device can provide additional memory when high processing needs exist. The secondary storage device can be a storage device in the form of any suitable non-transitory computer-readable medium, such as a memory card, a hard disk drive, a solid-state drive, a flash drive, or an optical drive. Further, the secondary storage device can be a component of the computing device 200 or can be a shared device accessible via a network. In some implementations, the application in the memory 204 can be stored in whole or in part in the secondary storage device and loaded into the memory 204 as needed for processing.

In addition to the processor 202 and the memory 204, the computing device 200 can include input/output (I/O) devices. For example, the computing device 200 can include an I/O device 206. The I/O device 206 can be implemented in various ways, for example, it can be a display that can be coupled to the computing device 200 and configured to display a rendering of graphics data. The I/O device 206 can be any device capable of transmitting a visual, acoustic, or tactile signal to a user, such as a display, a touch-sensitive device (e.g., a touchscreen), a speaker, an earphone, a light-emitting diode (LED) indicator, or a vibration motor. The I/O device 206 can also be any type of input device either requiring or not requiring user intervention, such as a keyboard, a numerical keypad, a mouse, a trackball, a microphone, a touch-sensitive device (e.g., a touchscreen), a sensor, or a gesture-sensitive input device. If the I/O device 206 is a display, for example, it can be a liquid crystal display (LCD), a cathode-ray tube (CRT), or any other output device capable of providing a visual output to an individual. In some cases, an output device can also function as an input device. For example, the output device can be a touchscreen display configured to receive touch-based input.

The I/O device 206 can alternatively or additionally be formed of a communication device for transmitting signals and/or data. For example, the I/O device 206 can include a wired means for transmitting signals or data from the computing device 200 to another device. For another example, the I/O device 206 can include a wireless transmitter or receiver using a protocol compatible to transmit signals from the computing device 200 to another device or to receive signals from another device to the computing device 200.

In addition to the processor 202 and the memory 204, the computing device 200 can optionally include a communication device 208 to communicate with another device. Optionally, the communication can be via a network. The network can be one or more communications networks of any suitable type in any combination, including, but not limited to, networks using Bluetooth communications, infra-red communications, near-field communications (NFCs), wireless networks, wired networks, local area networks (LANs), wide area networks (WANs), virtual private networks (VPNs), cellular data networks, or the Internet. The communication device 208 can be implemented in various ways, such as a transponder/transceiver device, a modem, a router, a gateway, a circuit, a chip, a wired network adapter, a wireless network adapter, a Bluetooth adapter, an infrared adapter, an NFC adapter, a cellular network chip, or any suitable type of device in any combination that is coupled to the computing device 200 to provide functions of communication with the network.

The computing device 200 can also include or be in communication with an image-sensing device (not shown), for example a camera, or any other image-sensing device now existing or hereafter developed that can sense an image such as the image of a user operating the computing device 200 or a view of a monitored environment. The image-sensing device can be positioned such that it is directed to capture a view of the monitored environment. For example, the image-sensing device can be directed toward a patient and/or a patient bed in a hospital room. In an example, the position and optical axis of the image-sensing device can be configured and/or controlled such that the field of vision (i.e., the view) includes an area of interest.

The computing device 200 can also include or be in communication with a sound-sensing device, for example a microphone, or any other sound-sensing device now existing or hereafter developed that can sense sounds near the computing device 200. The sound-sensing device can be positioned or controlled to be positioned such that it is directed toward a monitored environment so as to capture speech, other utterances, or other sounds within the monitored environment. The sound-sensing device can be configured to receive sounds, for example, speech or other utterances made by the user while the user operates the computing device 200. The computing device 200 can also include or be in communication with a sound playing device.

The computing device 200 (and any algorithms, methods, instructions, etc., stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors, or any other suitable circuit. In this disclosure, the term "processor" should be understood as encompassing any the foregoing, either singly or in combination. The terms "signal," "data," and "information" are used interchangeably.

Figure 3:
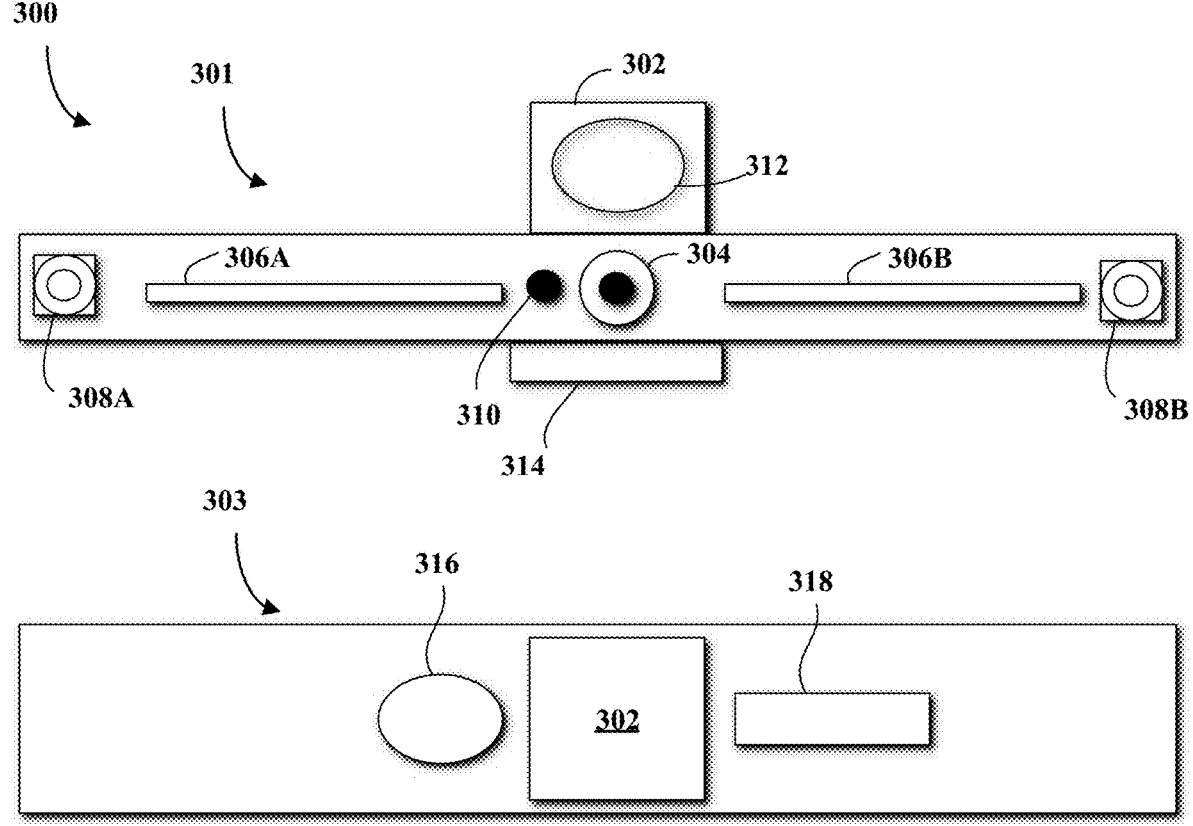
FIG. 3 is a block diagram of an example of a monitoring device according to implementations of this disclosure.

FIG. 3 is a block diagram of an example of a monitoring device 300 according to implementations of this disclosure. The monitoring device 300 can be the monitoring device 104 of FIG. 1. FIG. 3 shows a front view 301 and a top view 303 of the monitoring device 300. The front view 301 faces the monitored environment. The monitoring device 300 includes a camera 302, a fish-eye camera 304, microphone arrays 306A, 306B, infra-red light sensors 308A, 308B, a light sensor 310, a multi-color LED strip 312, a mounting device (i.e., a mount 314), a speaker 316, and a control panel 318. However, a monitoring device according to this disclosure is not so limited and can include fewer, additional, other sensors and/or components, or a combination thereof. While not specifically shown, the monitoring device 300 can also include a processor, as described with respect to the processor 202 of FIG. 2. The monitoring device 300 can also include a memory, such as the memory 204 if FIG. 2.

The camera 302 can be used to view the monitored environment. The camera 302 can include pan, tilt, zoom capabilities so that a remote user, via a user device, such as the user device 106 of FIG. 1, can control the camera 302 to pan, tilt, and/or zoom (PTZ) in order to adjust the view of the monitored environment to a desired view. That is, the monitoring device 300 can receive PTZ commands from the user device. The camera 302 can be capable of a magnification zoom factor of 10×, 12×, 20×, or some other magnification zoom factor. The fish-eye camera 304 can provide a 180° view of the monitored environment.

The microphone arrays 306A, 306B can be used to capture sounds in the monitored environment. The infra-red light sensors 308A, 308B can be used to improve viewing of the monitored environment, such as the monitoring device 104, under low light conditions, such as at night.

The light sensor 310 can be used to sense the ambient light present in the monitored environment. In an example, the amount of detected ambient light can be used to adjust an intensity of a display that may connected to the monitoring device 300. The multi-color LED strip 312 can be used to give a visual indication to an occupant of the monitored environment of an incoming video and/or audio call, that a video and/or audio call is ongoing, or that a video and/or audio call is not active. The multi-color LED strip 312 can be used to provide other visual indicators to the occupant of the monitored environment.

The mount 314 can be used to mount the monitoring device on top of a monitor or a television. In an example, the monitor can be a portable computing device, such as a tablet. In an example, the monitoring device 300 may not itself include a processor. However, via an external connection (shot shown), such as a USB connection, a firewire connection, a Bluetooth connection, or the like, can be connected to a general purpose computer to enable the general purpose computer to perform monitoring functions of the monitored environment. As such, by connecting the monitoring device 300 to any processing unit, the processing unit can be turned into a telehealth end point. In such a configuration, the monitoring device encompasses the processor-less monitoring device plus the processor to which the processor-less monitoring device is connected to.

The speaker 316 can be used to output sounds (e.g., voice, speech, etc.), such as those received from a user device, such as the user device 106 of FIG. 1. The control panel 318 can include controls for muting, unmuting, and controlling the volume of the speaker 316. The control panel 318 can also include controls for controlling whether the camera 302 is enabled or disabled. When the camera 302 is disabled, the camera 302 does not visually (via video or images) capture (e.g., view) the monitored environment.

Figure 4:
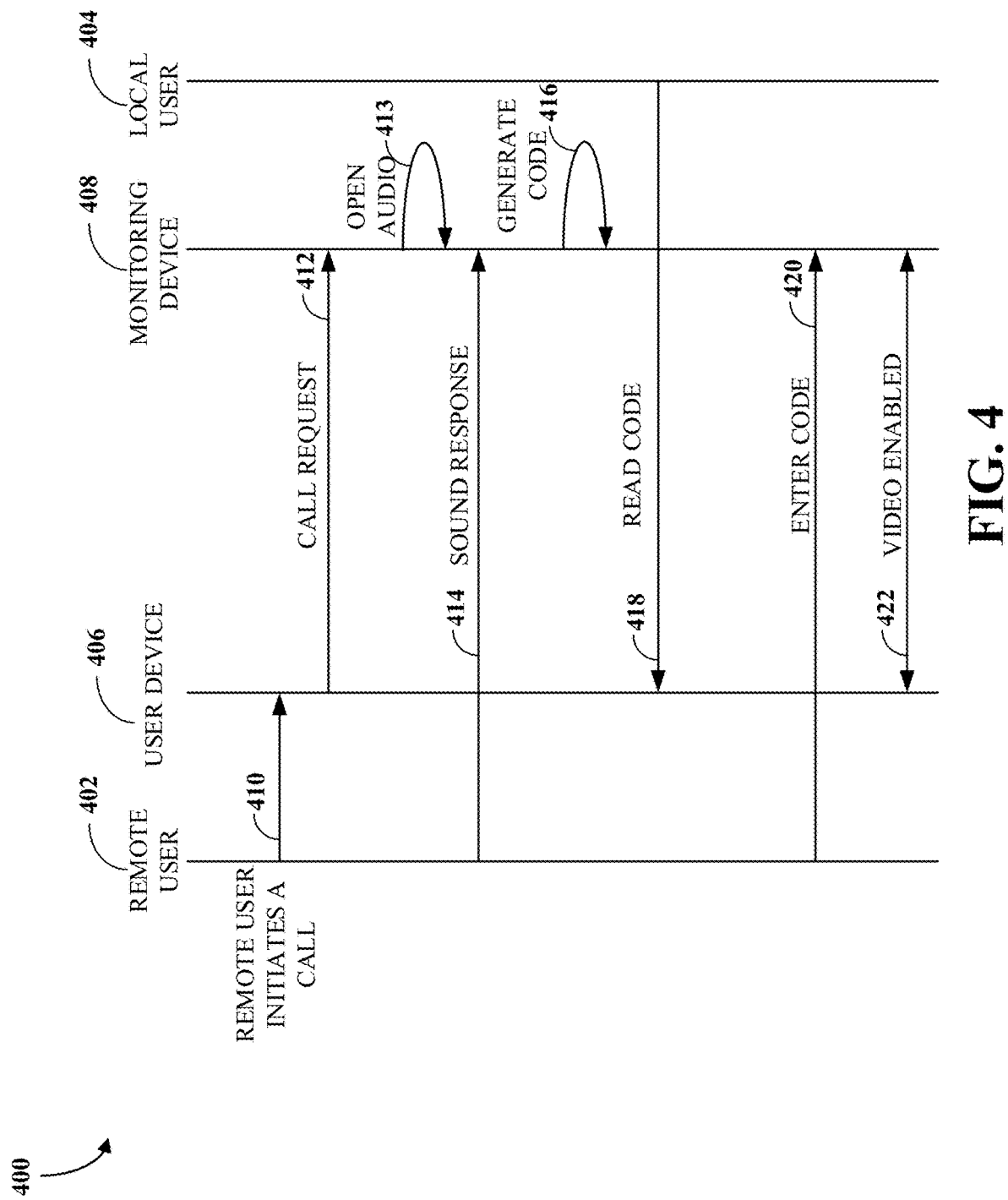
FIG. 4 is an example of an interaction diagram of door-knocking for teleconferencing according to implementations of this disclosure.

FIG. 4 is an example of an interaction diagram 400 of door-knocking for teleconferencing according to implementations of this disclosure. In the interaction diagram 400, a remote user 402, using a user device 406, initiates a teleconference with a local user 404 via the monitoring device 408. The user device 406 can be the user device 106 of FIG. 1 or the computing device 200 of FIG. 2. The monitoring device 408 can be monitoring device 104 of FIG. 1, the computing device 200 of FIG. 2, or the monitoring device 300 of FIG. 3.

At 410, the remote user 402 initiates a teleconference request using the user device 406. In an example, the remote user 402 can initiate the teleconference request using an application, a web page, a link, a user interface, or the like that can be available on the user device 406.

In an example, the teleconference request can be sent directly to the monitoring device to establish a peer-to-peer teleconference session. In another example, the teleconference request can be received at a server (not shown in FIG. 4), such as the server 108 of FIG. 1. The server can manage (e.g., direct, control, issue commands to, monitor, etc.) the monitoring device 408 and can be responsive to requests from the user device 406, as described herein.

Figure 8:
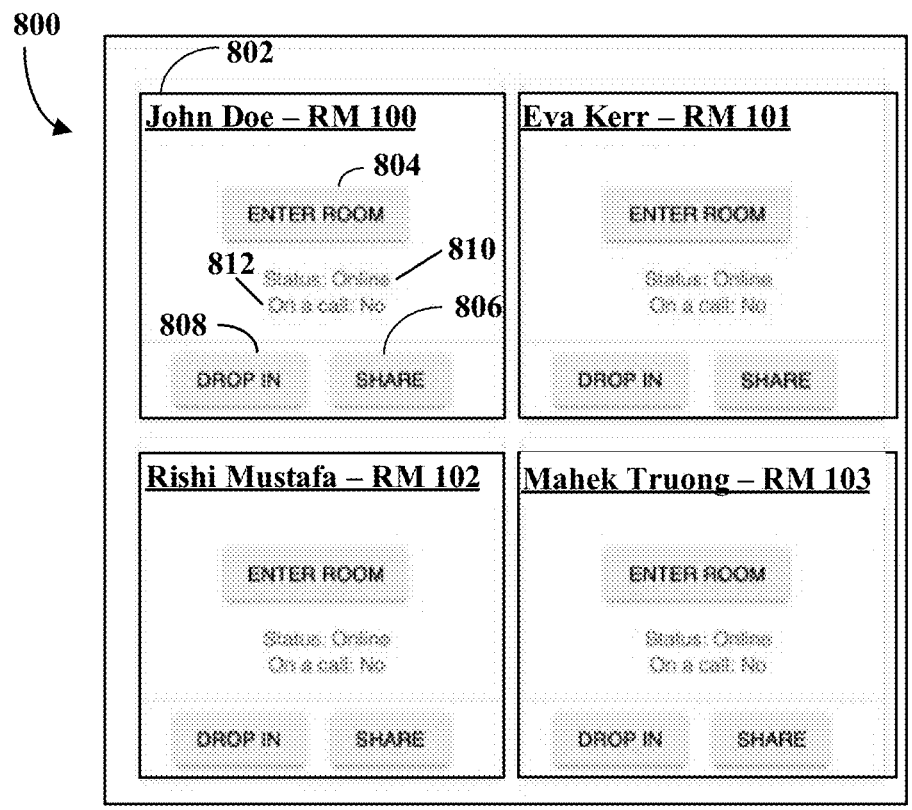
FIG. 8 is an example of a user interface that can be used by a remote user to initiate a teleconference request according to implementations of this disclosure.

FIG. 8 is an example of a user interface 800 that can be used by a remote user to initiate a teleconference request according to implementations of this disclosure. The user interface 800 can be presented on a user device, such as the user device 106 of FIG. 1, of a health care provider, such as a physician. In other implementations, the user interface 800 can include more, fewer, other controls and/or information than those described herein. In other implementations, the user interface 800 can have a different layout than that shown in FIG. 8.

In an example, the user interface 800 can be or can include a listing of all patients who are assigned to the physician. Equivalently, the user interface 800 can include a listing of all the monitoring devices of the patients who are assigned to the physician. For example, the user interface 800 includes an entry 802 that represents the hospital room number 100 of the patient John Doe. The entry 802 includes a control 804 that the physician can use to initiate a teleconference with the monitoring device that is assigned to the patient of the hospital room 100. That a monitoring device is assigned to a patient can mean that the monitoring device is permanently fixed in the room, such as being mounted on a wall of the hospital room; or that the monitoring device is movable and is temporarily placed in the room. For example, the monitoring device may be a robot that can travel from room to room upon the physician requesting to enter a room. For example, the monitoring device can be, or can be mounted on, a telemedicine computer cart that can be transported (e.g., wheeled, pushed, etc.), such as by a nurse, from room to room. In an example, a unique mechanism (e.g., a URL, a web link, or the like) may be associated with a monitoring device. The unique mechanism allows the remote user to initiate a teleconference with the monitoring device.

The entry 802 is shown to also include a share control 806, a drop in control 808, a status 810, and a busy status 812.

Using the share control 806, the remote user can send (e.g., forward, transmit, etc.), or can have sent, to another remote user, information or commands necessary for the other remote user to join an already established teleconference session between the user device 406 and the monitoring device 408. To illustrate, in the course of a telemedicine session, the physician (e.g., the remote user) may need a consult a specialist (e.g., the other remote user). Thus, the physician can share the connection mechanism with the specialist who can use the connection mechanism to join the telemedicine session.

When the remote user activates the drop in control 808, a teleconference session can be established between the user device 406 and the monitoring device 408 where both the audio and the video channels are automatically enabled at the monitoring device 408. That is, when the remote user 402 activates the drop in control 808, an audio and visual teleconference is established and the remote user can hear sounds (e.g., noises, speech, etc.) captured by a microphone of the monitoring device, such as the microphone arrays 306A, 306B of FIG. 3, and see visuals (e.g., video, images, etc.) captured by a camera of the monitoring device, such as the camera 302 of FIG. 3.

In an example, when the remote user activates the drop in control 808, a drop-in request can be received at the server. The server in turn can establish a connection between the user device 406 and the monitoring device 408 and can send commands to the monitoring device to enable the camera, the microphone, and/or speaker of the monitoring device 408. In an example, when the remote user activates the drop in control 808, a drop-in request can be received at the monitoring device 408. The monitoring device 408 can in turn accept the teleconference connection with the user device 406 and enable the camera, the microphone, and/or the speaker of the monitoring device 408.

The status 810 indicates whether the monitoring device of the entry 802 (i.e., of the hospital room 100) is currently accessible (e.g., via a network) from the user device 406. The busy status 812 indicates whether the monitoring device of the entry 802 is currently engaged in another teleconference.

At 412, the teleconference request is sent from the user device 406 to establish a connection with the monitoring device 408. As mentioned above, in an example, the teleconference request can be sent directly to the monitoring device 408 to establish a peer-to-peer teleconference session; and in another example, the teleconference request can be received at the server.

At 413, the audio channel of the teleconference can be established. That is, the speaker(s) of the monitoring device can be enabled so that the local user can hear what the remote user may say. In an example, the server can send a command to the monitoring device 408 to cause the monitoring device 408 to enable the speaker. In an example, a message can alert the local user of the teleconference. For example, a sound (e.g., a chime, etc.) may be output using the speaker(s) of the monitoring device 408. For example, a verbal message such as "incoming teleconference request" may be output. Other auditory or visual messages are also possible. For example, a pre-stored, profile image of the remote user 402 can be displayed to the local user 404. For example, when the remote user 402 initiates the request at 410, an image of the remote user 402 may be captured by a camera of the user device 406 and displayed to the local user 404 on a display of the monitoring device 408.

At 414, the remote user 402 can request that the local user accept the teleconference request. For example, a user interface, such as the user interface of FIG. 9, may be displayed to the remote user 402.

Figure 9:
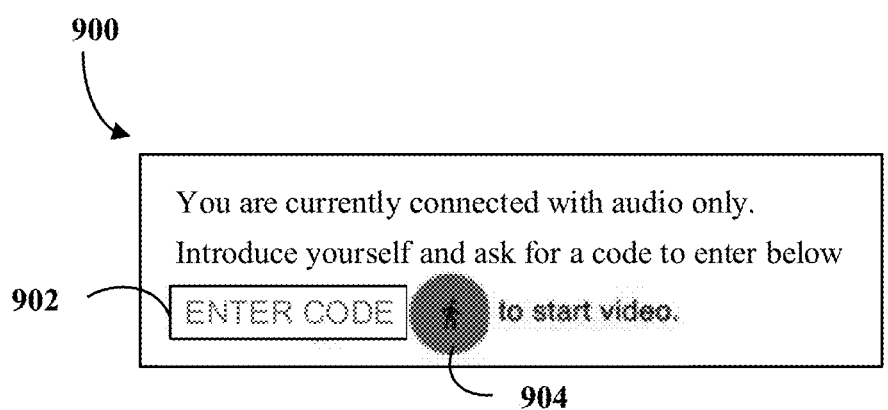
FIG. 9 is an example of a user interface that a remote user can use to request that a local user accept the teleconference request according to implementations of this disclosure.

FIG. 9 is an example of a user interface 900 that the remote user 402 can use to request that the local user 404 accept the teleconference request according to implementations of this disclosure. The user interface 900 can be displayed on the user device 406 of the remote user. The user interface 900 can inform the remote user 402 that an audio-only connection has been established with the monitoring device 408. The user interface 900 can further instruct the remote user 402 to introduce him/herself and request that the local user 404 provide the remote user 402 with an entry code that the remote user 402 enters in a field 902 to start the video channel of the teleconference, after the remote user 402 hits the enter key or presses the control 904.

In an example, the user interface 900 can be overlaid on a blurred static image or a blurred moving image of the monitored environment. In this way, the remote user 402 can tell whether at least someone is in the monitored environment to receive and accept the teleconference request. As mentioned, the view is blurred to protect the privacy of the local user 404. As such, in this example, receiving the blurred image or video from a camera of the monitoring device 408 is not considered that the video channel is enabled.

At 416, the entry code is generated. The entry code can be a string of characters that is randomly generated. The entry code is preferably short, such as three to six characters long. The entry code is preferably numeric. In an example, the server can generate the entry code. In an example, the monitoring device can generate the entry code. The entry code can be displayed on a display of the monitoring device 408. At 418, the local user 404, or another close-by person, can read the entry code to the remote user 402.

In yet another example, the entry code can be obtained from the local user 404. For example, in response to receiving the request for a teleconference from the remote user 402, the local user may be instructed to provide the entry code. In an example, speech recognition can be used to understand an uttered entry code and transmit the speech-recognized entry code to the remote user 402. Text-to-speech can be used at the user device 406 to output the speech-recognized entry code to the remote user 402. In another example, the uttered entry code can be recorded by the monitoring device 408 and the recording of the uttered entry code can be transmitted to the remote user 402 and output via speakers of the user device 406.

In another example, rather than instructing the remote user 402 to request the entry code from the local user 404, the entry code may be electronically sent to the remote user 402. In an example, the server can send the entry code to the remote user 402. In an example, the monitoring device can send the entry code to the remote user 402. In an example, the entry code can be sent to the remote user 402 in a text message to a telephone number of the remote user 402, in an email to an email address of the remote user 402, or the like. In an example, speech recognition can be used to determine whether the local user 404 accepts the teleconference request. For example, in response to a prompt, such as "incoming call from Dr. Jones; Say YES to accept call. Say NO to reject," output by the monitoring device 408, the local user may respond with "yes," "yes, accept call," or the like response indicating acceptance of the teleconference request. In response to the local user 404 indicating acceptance, the entry code can be generated and sent to the remote user 402.

At 420, the remote user 402 enters an entered code in the field 902. The entered code is intended to be the received entry code. However, the remote user 402 may make a mistake in entering the received entry code. In another example, another unauthorized person may be attempting to obtain visual access to the monitored environment by attempting random codes.

At 422, if the entered code matches the received entry code, then the video channel of the teleconference is open. That is, the camera of the monitoring device 408 is enabled. In an example, the server determines whether the entered code matches the received entry code and, if so, issues a command to the monitoring device to enable the camera.

In an example, a validity period can be associated with the entry code. As such, if the entered code is not received, such as at the server or the monitoring device 408, within the validity period, then the teleconference session can be disconnected (e.g., terminated, etc.). That is, the audio channel can be closed and any established network connection between the user device 406 and the monitoring device 408 can be disconnected. The validity period can be 10 seconds, 15 seconds, 20 seconds, fewer, or more seconds.

Figure 5:
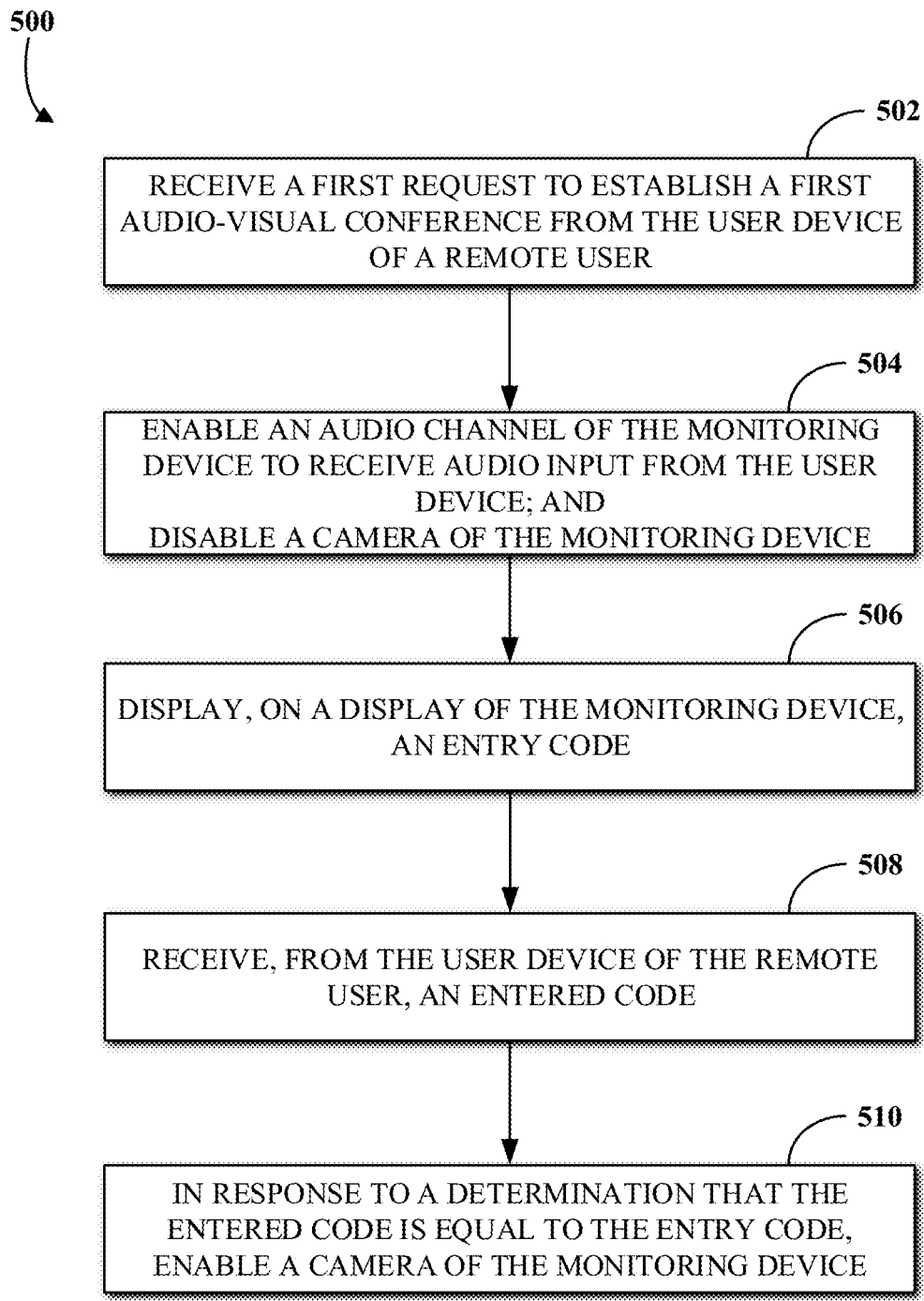
FIG. 5 is an example of a flowchart of a technique for teleconferencing between a monitoring device and a user device according to implementations of this disclosure.

FIG. 5 is an example of a flowchart of a technique 500 for teleconferencing between a monitoring device and a user device according to implementations of this disclosure. The technique 500 can be used to establish an audio-visual teleconference between a user of the monitoring device and a user of the user device. When an initial connection is established between the user device and the monitoring device, the audio channel is opened (i.e., enabled, activated, etc.). The video channel is not activated until the remote user of the user device successfully enters a provided entry code.

The monitoring device can the monitoring device 104 of FIG. 1, the monitoring device 300 of FIG. 3, or the monitoring device 408 of FIG. 4. The user device can be the user device 106 of FIG. 1 or the user device 406 of FIG. 4. The technique 500 can be implemented, partially or fully, by the monitoring device. The technique 500 can be implemented, partially or fully, by a server, such as the server 108 of FIG. 1. The technique 500 can be implemented by a computing device, such as the computing device 200 of FIG. 2. The technique 500 can be implemented as computer instructions that may be stored in a memory, such as the memory 204 of FIG. 2. The computer instructions can be executed by a processor, such as the processor 202 of FIG. 2. As mentioned above, the monitoring device may not itself include a processor but may be connected to the processor. Thus, the technique 500 can be implemented, partially or fully, by the processor to which the monitoring device is connected.

At 502, the technique 500 receives a first request to establish a first audio-visual conference from the user device of a remote user. The first request can be received at the server. The first request can be received at the monitoring device.

At 504, the technique 500 enables an audio channel of the monitoring device to receive audio input from the user device and disables a camera of the monitoring device. In an example, enabling the audio channel can mean unmuting a speaker of the monitoring device. In an example, enabling the audio channel can mean unmuting the speaker of the monitoring device and enabling the microphone of the monitoring device. In an example, disabling the camera of the monitoring device can mean that no visual data (images and/or video) of the monitored environment are transmitted to the user device. In another example, disabling the camera of the monitoring device can mean that no perceptible visual data of the monitored environment are transmitted to the user device. For example, disabling the camera of the monitoring device may include transmitting blurred visual data to the user device. In an example, the visual data can be blurred by the monitoring device (e.g., a blurring module therein). In another example, the visual data can be blurred by the server (e.g., a blurring module therein). As such, in an example, enabling, in response to the first request, the audio channel of the monitoring device can include transmitting, to the user device, a blurred video of a monitored environment that is monitored by the monitoring device.

At 506, the technique 500 displays, on a display of the monitoring device, an entry code. The term "entry code" describes a code that, when successfully provided by the remote user, enables the remote user to enter into an audio-visual teleconference with the local user. In an example, the entry code can be generated by the server and displayed on the display of the monitoring device. In an example, the entry code can generated by the monitoring device.

At 508, the technique 500 receives, from the user device of the remote user, an entered code. For example, as described with respect to FIG. 4, the local user may provide the entry code to the remote user by reading the entry code to the remote user. The remote user can provide (e.g., enter, etc.) an entered code in a user interface, such as the user interface described with respect to FIG. 9. The code entered by the remote user is referred to as an "entered code" to account for situations where the remote user may enter a code that is not equal to the entry code.

At 510, in response to determining that the entered code is equal to the entry code, the technique 500 enables a camera of the monitoring device. In an example, the server determines whether the entered code is equal to the entry code and, if so, the server sends a command to the monitoring device to enable the camera. In an example, the monitoring device determines whether the entered code is equal to the entry code. In either case, if the remote user successfully enters the entry code, the remote user and the local user are placed in an audio-visual teleconference.

In an example, the technique 500 can include transmitting the entry code to the remote user of the user device. For example, the entry code may be transmitted to a phone number, such as via a text message, an email address, or the like of the remote user.

As mentioned above, the entry code can be verbally transmitted, by a local user of the monitoring device, to the remote user of the user device. As also mentioned above, a validity period can be associated with the entry code. As such, in response to not receiving, from the user device of the user remote user, the entered code during the validity period, the technique 500 can disconnect the monitoring device from the user device. That is, if the remote user does not successfully enter the entry code within the validity period of the entry code, the audio channel of the teleconference can be disconnected. That is, any session established between monitoring device and the user device is disconnected.

Figure 6:
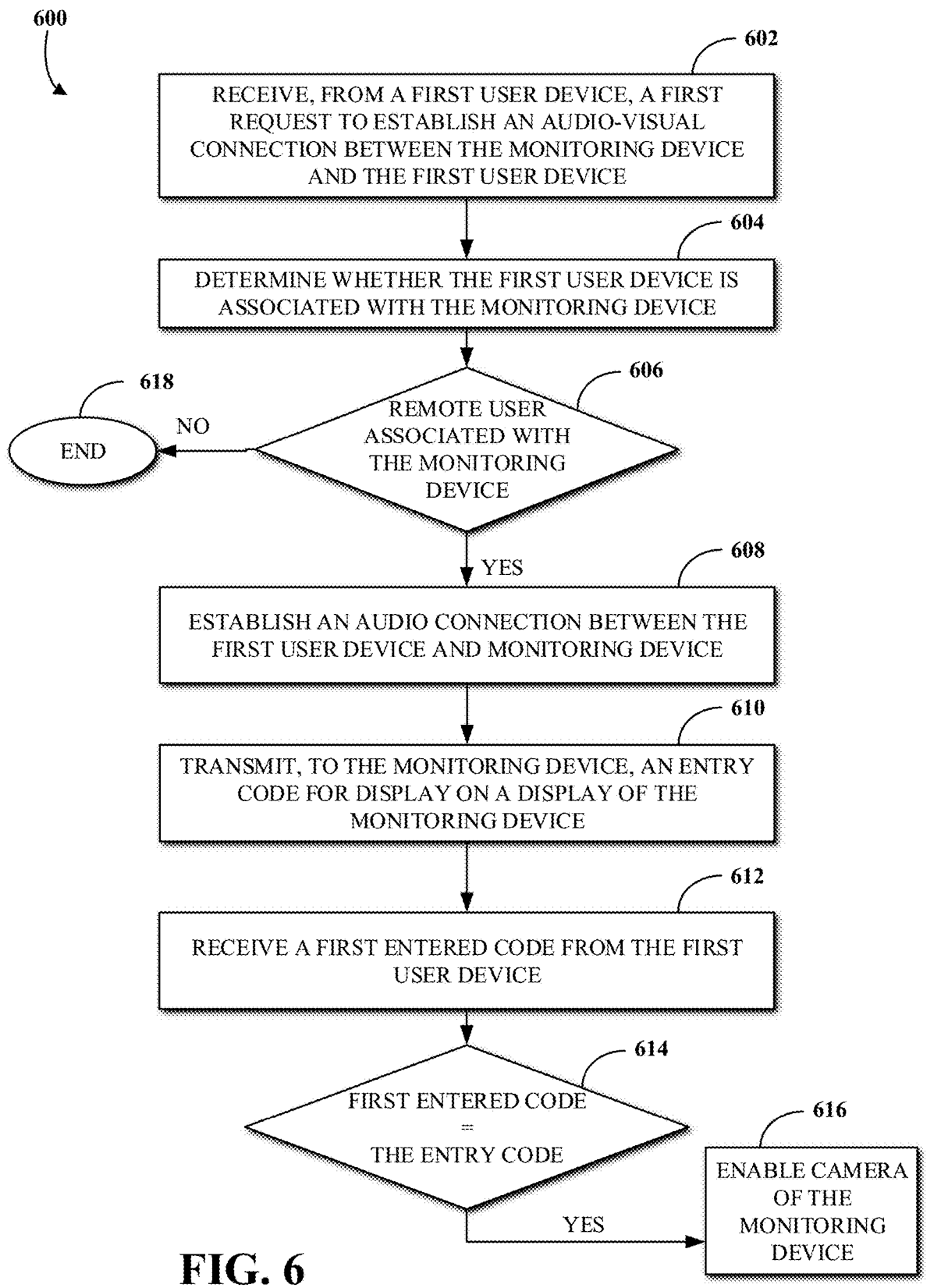
FIG. 6 is another example of a flowchart of a technique for teleconferencing between a monitoring device and a user device according to implementations of this disclosure.

FIG. 6 is another example of a flowchart of a technique 600 for teleconferencing between a monitoring device and a user device according to implementations of this disclosure. The technique 600 can be used to establish an audio-visual teleconference between a user of the monitoring device and a user of the user device. When an initial connection is established between the user device and the monitoring device, the audio channel is opened (i.e., enabled, activated, etc.). The video channel is not activated until the remote user of the user device successfully enters a provided entry code.

The monitoring device can be the monitoring device 104 of FIG. 1, the monitoring device 300 of FIG. 3, or the monitoring device 408 of FIG. 4. The user device can be the user device 106 of FIG. 1 or the user device 406 of FIG. 4. The technique 600 can be implemented, partially or fully, by a system that includes the monitoring device and a server, such as the server 108 of FIG. 1. The technique 600 can be implemented, partially or fully, by a server, such as the server 108 of FIG. 1. The technique 600 can be implemented by a computing device, such as the computing device 200 of FIG. 2. The technique 600 can be implemented as computer instructions that may be stored in a memory, such as the memory 204 of FIG. 2. The computer instructions can be executed by a processor, such as the processor 202 of FIG. 2. As mentioned above, the monitoring device may not itself include a processor but may be connected to the processor. Thus, the technique 600 can be implemented, partially or fully, by the processor to which the monitoring device is connected.

At 602, the technique 600 receives, from a first user device, a first request to establish an audio-visual connection between the monitoring device and the first user device. The first request can be received at the server. In an example, the remote user of the first user device can select the monitoring device from a list of monitoring devices, as described with respect to FIG. 8. Thus, in an example, the technique 600 can include transmitting, to the first user device, a list of all monitoring devices that the remote user is associated with. The first user device may then display the list on a display of the first user device. In another example, the remote user can be a visitor as described with respect to FIGS. 10-11, which are described below.

At 604, the technique 600 determines whether the first user device is associated with the monitoring device. In an example, the server can perform the determination. In an example, the first user can be a health care provider. In an example, the first user can be a visitor, such as a family member of the patient in whose room the monitoring device is placed. In an example, the technique 600 can include associating the first user device with the monitoring device. An association of the first user device with the monitoring device can include a validity period. The association can include available times. The association can include a validity period and available times during the validity period. In an example, associating the first user device with the monitoring device can include associating an identification of the remote user of the first user device with the monitoring device. The identification of the remote user can be an email of the remote user, a phone number of the remote user, some other identification of the remote user, or a combination thereof.

In the case of a health care provider, the server can include a registry (not shown), such as database, of which patients are assigned to the health care provider, as described with respect to FIG. 8. In the case that the first user is a visitor, the visitor may be provided a mechanism to connect to the monitoring device of the local user. To illustrate, a visitor can be registered as an allowed visitor, such as described with respect to FIG. 10.

Figures 10, 11:
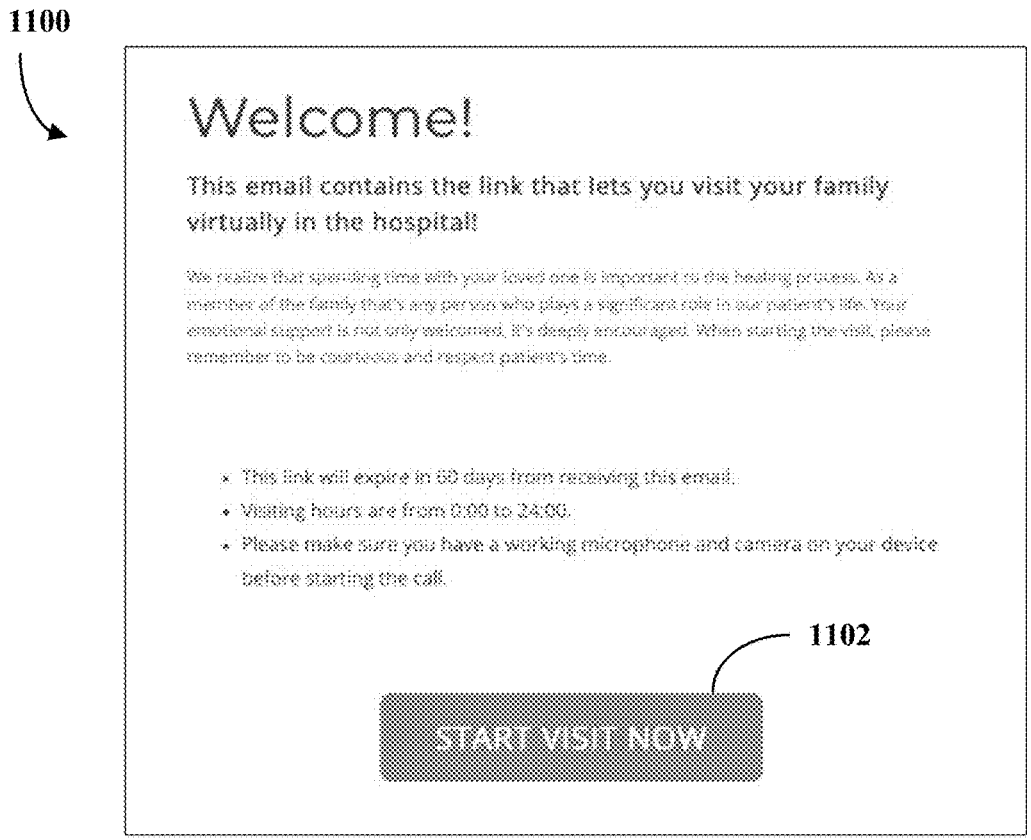
FIG. 10 is an example of a user interface 1000 of visitor registration according to implementations of this disclosure.
FIG. 11 is an example of a connection mechanism that is sent to a visitor according to implementations of this disclosure.

FIG. 10 is an example of a user interface 1000 of visitor registration according to implementations of this disclosure. The user interface 1000 can be presented on a display of a registration agent (not shown), such as, for example, at a health care facility. The user interface 1000 can be generated by the server. The user interface 1000 is a mere example of visitor registration and other user interfaces are possible. The user interface 1000 includes a visitor contact field 1002 field. In the visitor contact field 1002, the phone number or an email address of the visitor to whom a connection mechanism is to be sent enabling the visitor to establish an audio-visual teleconference with a monitoring device.

In a link expiration section 1004, the registration agent can enter a validity period of the connection mechanism (e.g., a link). FIG. 10 shows that a link can be valid for 1 hour, 4 hours, 8 hours, 24 hours, or 48 hours. However, other expiration periods are possible. The visitor would not be able to use the connection mechanism after the indicated expiration period. In a visiting hours section 1006, the registration agent can indicate the times of day (e.g., the visiting hours) that the connection mechanism can be used to connect to the monitoring device. FIG. 10 shows that the visiting hours (i.e., available times) are listed as anytime, 6 am-8-pm, 8 am-4-m, 9 am-7 pm, and 11 am-6 pm. However, other visiting hours are possible. The connection mechanism can be sent to the visitor's contact information entered in the visitor contact field 1002. The connection mechanism can be sent to the visitor's contact information in response to the registration agent pressing a control 1008. The user interface 1000 illustrates that a connection mechanism has been sent to a visitor 1010 having the email address ghafranabbas@gmail.com. A delete button 1012 can be used to dissociate the connection mechanism from the visitor so that the visitor is no longer able to use the connection mechanism to connect to the monitoring device.

FIG. 11 is an example 1100 of a connection mechanism that is sent to a visitor according to implementations of this disclosure. The example 1100 illustrates an example of an email that can be sent to a visitor in response to the registration agent pressing the control 1008 of FIG. 10. The email includes a control 1102, which, when pressed, causes the server to receive a request to establish an audio-visual connection between the monitoring device and a device of the visitor. Thus, the technique 600 can include sending a link to the remote user, which the remote user uses as the first request to establish the audio-visual connection between the monitoring device and the first user device.

Returning to FIG. 6, at 606, if the first user device is not associated with the monitoring device, the technique 600 ends at 618; otherwise, the technique 600 proceeds to 608. At 608, the technique 600 establishes an audio connection between the first user device and monitoring device. For example, the server can establish the connection between the first user device and the monitoring device, and can issue a command to the monitoring device to enable the audio channel (e.g., a microphone or both a microphone and a speaker) and disable the video channel (e.g., a camera) of the monitoring device.

At 610, the technique 600 transmits, to the monitoring device, an entry code for display on a display of the monitoring device. At 612, the technique 600 receives a first entered code from the first user device. For example, the first entered code can be received from the first user device when the first user of the first user device enters the entered code in the user interface 900 of FIG. 9. At 614, the technique 600 determines whether the first entered code is equal to the entry code. If the first entered code is equal to the entry code, the technique 600 proceeds to 616 to enable a camera of the monitoring device. For example, the server can send a command to the monitoring device to enable the camera. In an example, if the first entered code is not equal to the entry code, the technique 600 may enable the remote user to re-enter (i.e., retry, etc.) the code a predetermined number of times. If the remote user is not successful in entering the entry code after the predetermined number of times, then the technique 600 can disconnect the connection. In another example, if the first entered code is not equal to the entry code, the technique 600 can immediately disconnect the connection.

In example, the technique 600 can include, in response to determining that the first user device is not associated with the monitoring device, rejecting the first request to establish the audio-visual connection. For example, the technique 600 can send a message to the first user device indicating the connection was rejected. The message can include a reason why the connection was not established.

In an example, the technique 600 can include receiving a share request from the remote user to share the link with another user; and sending, in response to the share request, the link to the other user. For example, a user of the user interface 800 of FIG. 8 can use the share control 806 to share the connection mechanism to the other user. In an example, a visitor can forward the link received as described with respect to FIG. 11 to the other user.

In an example, the technique 600 can further include receiving a second request to establish another audio-visual connection between the monitoring device and a second user device; and, in response to not receiving a second entered code within a predetermined response time, sending a message to the second user device that the predetermined response time has elapsed and disconnecting the another audio-visual connection. For example, as described above with respect to FIG. 4, a validity period can be associated with the entry code. If the server does not receive an entered code within the validity period, then the audio-visual connection (more specifically, the audio connection) is disconnected and the other user would have to re-request a connection and re-request another entry code from the local user.

Figure 7:
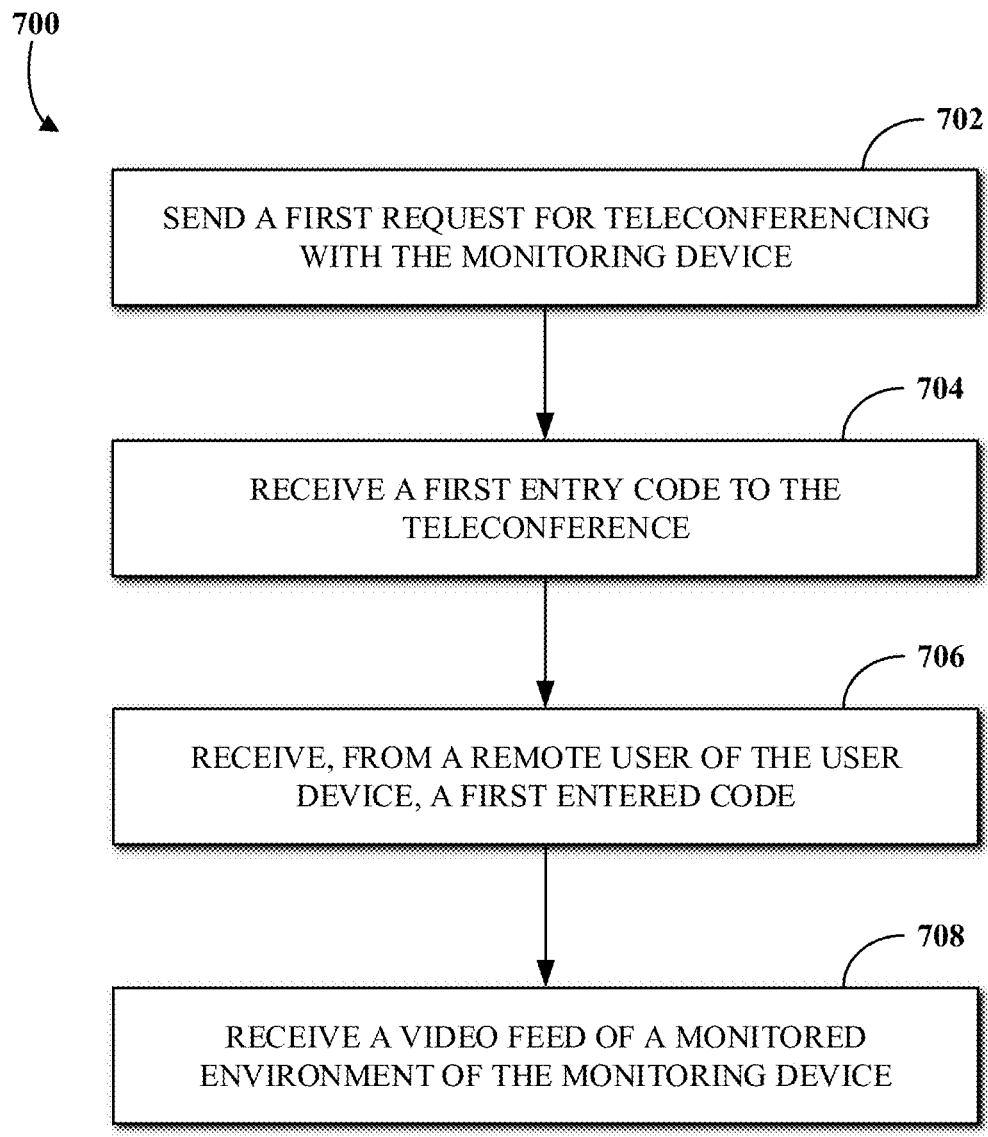
FIG. 7 is another example of a flowchart of a technique for teleconferencing between a monitoring device and a user device according to implementations of this disclosure.

FIG. 7 is another example of a flowchart of a technique 700 for teleconferencing between a monitoring device and a user device according to implementations of this disclosure. The technique 700 can be implemented by a user device, such as the user device 106 of FIG. 1 or the user device 406 of FIG. 4. The technique 700 can be implemented by a computing device, such as the computing device 200 of FIG. 2. The technique 700 can be implemented as computer instructions that may be stored in a memory, such as the memory 204 of FIG. 2. The computer instructions can be executed by a processor, such as the processor 202 of FIG. 2.

At 702, the technique 700 sends a first request for teleconferencing with the monitoring device. For example, the first request can be sent as described with respect to the control 804 of FIG. 8. For example, the first request can be sent when a connection mechanism, such as described with respect to the control 1102 of FIG. 11. In an example, it may be possible for the remote user to copy a link (e.g., a URL, etc.) associated with the control 1102 and enter the link in an address bar of a web browser to initiate the first request.

At 704, the technique 700 receives a first entry code to the teleconference. For example, the entry code may be received at the user device as a voice entry, which can be played out via a speaker of the user device. Thus, in an example, the technique 700 can include outputting, via a microphone of the user device, the first entry code to the teleconference. For example, the entry code can be received as a text entry. For example, speech recognition can be used at the monitoring device or a server to recognize the entry code as uttered by the local user. The speech-recognized textual code can be sent to the remote user in an email or a text message. In an example, receiving the first entry code can include receiving a blurred image of the monitored environment and overlaying the first entry code on the blurred image.

At 706, the technique 700 receives, from the remote user of the user device, a first entered code. For example, the remote user can enter the entered code in a user interface, such as the user interface 900 of FIG. 9. At 708, the technique 700 receives a video feed of a monitored environment of the monitoring device, which can be the monitored environment 102 of FIG. 1. The user device receives the video in response to the first entry code matching the first entered code, as determined, for example, by a server, such as the server 108 of the FIG. 1.

In an example, the technique 700 can receive a list of monitoring devices that the remote user is associated with, where the list of monitoring devices includes the monitoring device; and display, on a display of the user device, the list of monitoring device. In an example, the list of the monitoring devices can be as described with respect to FIG. 8. In an example, the list of monitoring devices can be received from the server.

In an example, the technique 700 can include sending a second request for teleconferencing with the monitoring device; and, in response to not receiving a second entered code within a predetermined response time, receiving a message that the predetermined response time has elapsed and no longer accepting the second entered code.

For simplicity of explanation, the techniques 500, 600, and 700 of FIGS. 5, 6, and 7, respectively, are depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the monitoring device 300, and/or any of the components therein described with respect to FIG. 3 (and the techniques, algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, in one aspect, for example, the monitoring device 300 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for teleconferencing between a monitoring device and a user device, comprising:
   establishing an audio channel connection between the user device and the monitoring device of a remote user;
   displaying an entry code on a display of the monitoring device;
   obtaining from a user of the monitoring device a verbal confirmation of the entry code, wherein in response to the verbal confirmation, the entry code is sent to the remote user;
   performing speech recognition on the verbal confirmation of the entry code;
   transmitting a speech-recognized text entry code to the remote user; and
   in response to receiving the speech-recognized text entry code from the remote user, enabling a camera of the monitoring device, wherein enabling the camera of the monitoring device establishes an audio-visual connection between the user device and the monitoring device.

2. The method of claim 1, wherein obtaining from the user of the monitoring device the verbal confirmation to send the entry code to the remote user comprises: receiving, using a microphone of the monitoring device, the entry code as spoken by the user of the monitoring device.

3. The method of claim 1, wherein a validity period is associated with the entry code.

4. The method of claim 3, further comprising: in response to not receiving, from the user device of the remote user, the entry code during the validity period, disconnecting the monitoring device from the user device.

5. The method of claim 1, further comprising: transmitting, to the user device, a blurred video of a monitored environment that is monitored by the monitoring device.

6. The method of claim 1, wherein further comprising: displaying on the display of the monitoring device, information identifying the remote user while displaying the entry code on the display of the monitoring device.

7. The method of claim 1, wherein the speech-recognized text entry code is transmitted at least as a text message to the remote user or to an email address of the remote user.

8. The method of claim 1, wherein the verbal confirmation of the entry code comprises a positive confirmation by the user to accept a request to establish the audio-visual connection between the user device and the monitoring device.

9. A system for teleconferencing, comprising:
a monitoring device; and
a server;
  wherein the server is configured to:
    receive, from a first user device of a first remote user, a first request to establish a first audio-visual connection between the monitoring device and the first user device;
    transmit, to the monitoring device, an entry code for display on a display of the monitoring device;
    perform speech recognition on a verbal confirmation of the entry code;
    transmit a speech-recognized text entry code to the first remote user; and
    in response to receiving the speech-recognized text entry code from the first remote user, direct the monitoring device to enable a camera of the monitoring device; and
  wherein the monitoring device is configured to:
    establish an audio connection with the first user device;
    receive from a monitored user of the monitoring device a confirmation to send the speech-recognized text entry code to the first remote user; and
    enable the camera of the monitoring device in response to being directed by the server to enable the camera.

10. The system of claim 9, wherein the server is further configured to: receive, from a second user device of a second remote user, a second request to establish a second audio-visual connection between the monitoring device and the second user device; and in response to determining that the second remote user is not associated with the monitoring device, reject the second request to establish the second audio-visual connection.

11. The system of claim 9, wherein the server is further configured to: transmit, to the first user device, a list of all monitoring devices that first the remote user is associated with.

12. The system of claim 9, wherein the server is further configured to: send a link to the first remote user, wherein the first remote user uses the link as the first request to establish the first audio-visual connection between the monitoring device and the first user device.

13. The system of claim 9, wherein to receive from the monitored user of the monitoring device the confirmation to send the entry code to the first remote user comprises to: receive from the monitored user an utterance of the entry code.

14. A monitoring device of a user comprising: a processor configured to:
    receive, from a remote device, a request to enable a microphone of the monitoring device;
    receive an announcement of a remote user;
    display on a monitor of the monitoring device an entry code;
    receive, as a confirmation of the entry code, a verbal command from the user to send the entry code to the remote user;
    perform speech recognition on the verbal command;
    transmit, in response to the confirmation, the speech-recognized text entry code to the remote user; and
    enable, in response to receiving the speech-recognized text entry code from the remote user, a camera of the monitoring device.

15. The monitoring device of claim 14, wherein the verbal command comprises the entry code.

16. The monitoring device of claim 14, wherein the verbal command comprises the confirmation to establish an audio-visual conference between the monitoring device and the remote device.

17. The monitoring device of claim 14, wherein to transmit, in response to the confirmation, the entry code to the remote user comprises to: transmit the entry code in at least one of an audio format or a textual format to the remote user.

* * * * *